No. 781,379. PATENTED JAN. 31, 1905.
H. A. STAEDING.
APPARATUS FOR MAKING INLAID LINOLEUM.
APPLICATION FILED JAN. 22, 1904.
3 SHEETS—SHEET 1.
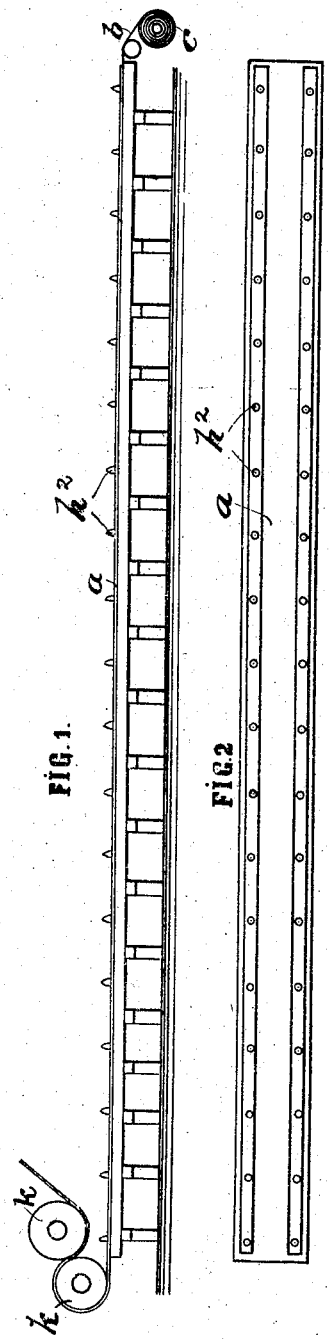
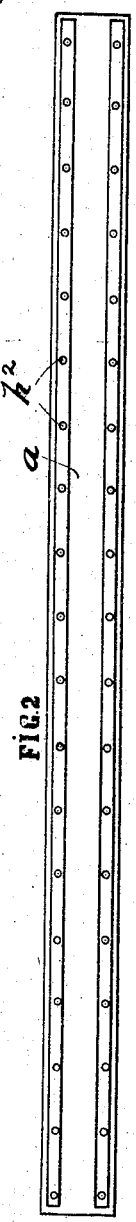
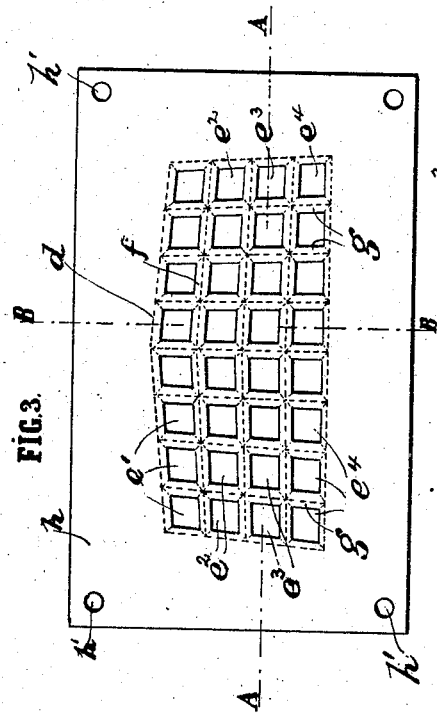
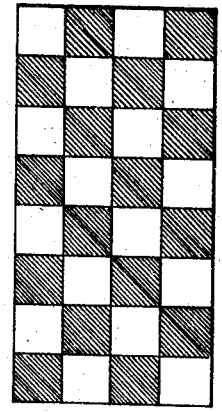
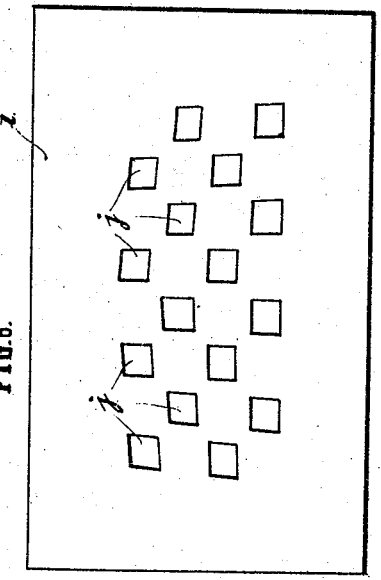
WITNESSES:
INVENTOR
Hugh A. Staeding
BY
ATTORNEY.

No. 781,379. PATENTED JAN. 31, 1905.
H. A. STAEDING.
APPARATUS FOR MAKING INLAID LINOLEUM.
APPLICATION FILED JAN. 22, 1904.
3 SHEETS—SHEET 2.
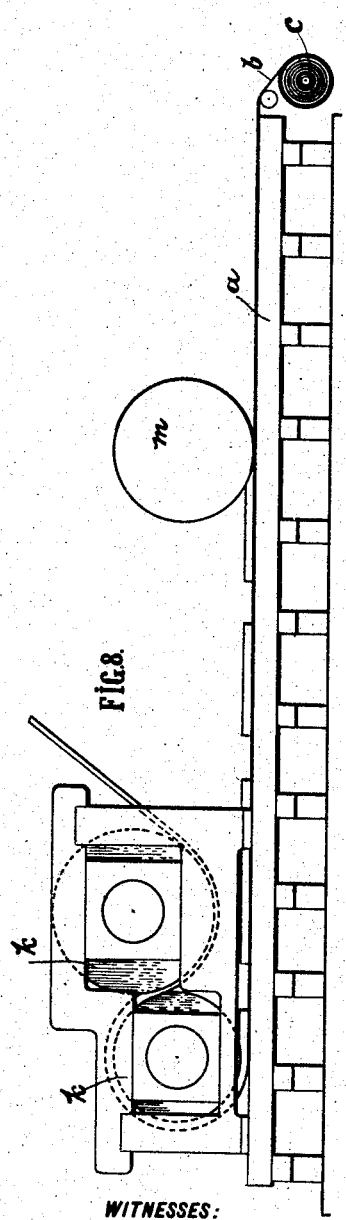
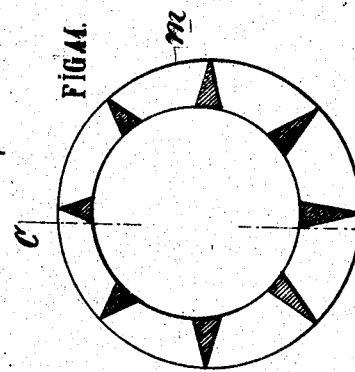
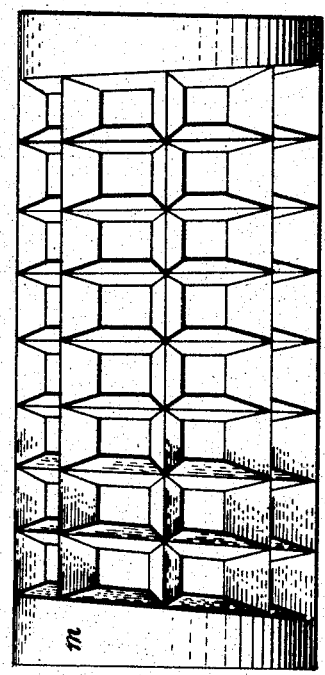
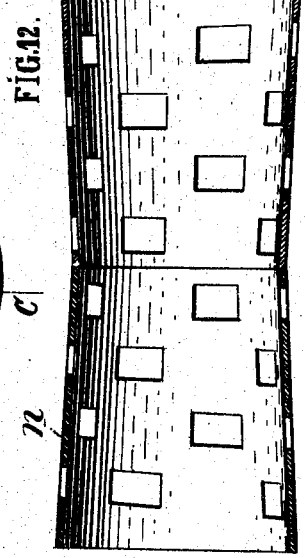
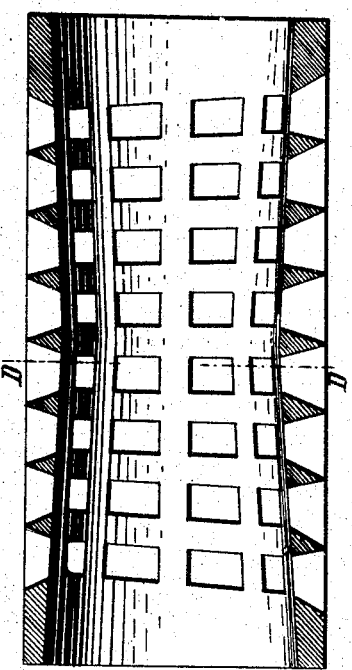
WITNESSES:
INVENTOR
Hugh A. Staeding
BY
ATTORNEY.

No. 781,379. PATENTED JAN. 31, 1905.
H. A. STAEDING.
APPARATUS FOR MAKING INLAID LINOLEUM.
APPLICATION FILED JAN. 22, 1904.
3 SHEETS—SHEET 3.
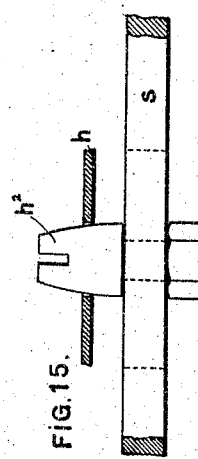
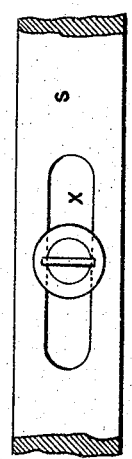
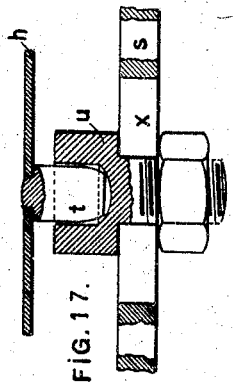
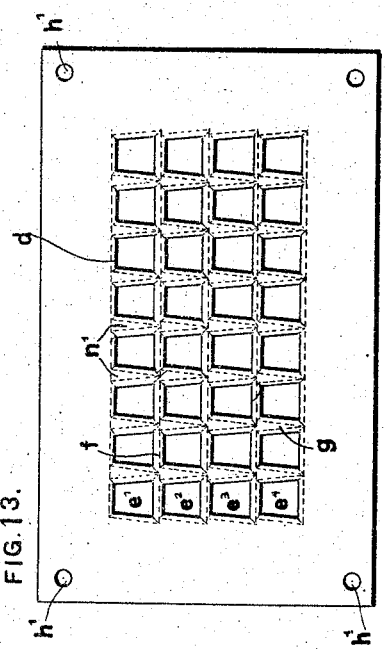
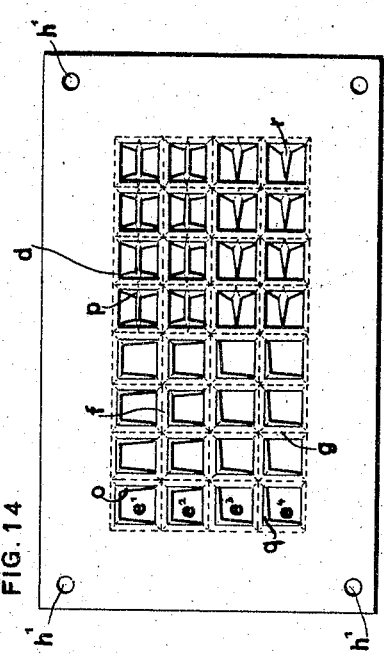
WITNESSES
R. M. Kelly.
M. J. Efoe.
INVENTOR
Hugh A. Staeding
BY
ATTORNEY.

No. 781,379. Patented January 31, 1905.

UNITED STATES PATENT OFFICE.

HUGH A. STAEDING, OF CAMDEN, NEW JERSEY.

APPARATUS FOR MAKING INLAID LINOLEUM.

SPECIFICATION forming part of Letters Patent No. 781,379, dated January 31, 1905.

Application filed January 22, 1904. Serial No. 190,202.

*To all whom it may concern:*

Be it known that I, HUGH A. STAEDING, of the city and county of Camden, State of New Jersey, have invented an Improvement in Apparatus for Making Inlaid Linoleum, of which the following is a specification.

One method of making inlaid linoleum as now practiced is to assemble a number of molded tesseræ—formed of a granular composition of cork-flour, wood-flour, and coloring-matter, mixed with a cement of oxidized oil and various gums—in proper relation to form the design and to compress them into a smooth sheet on a jute foundation by a flat press. Another method is to form flat sheets of the composition, to cut out the tesseræ from sheets of different colors, and assemble and compress them on the jute foundation. A better compression and consolidation of the granular material can be obtained by passing the sheet of assembled and uncompassed tesseræ between calender-rolls; but the rolling action of such rolls pushes back a certain percentage of the granular material and elongates and distorts the pattern.

It is the object of my invention to produce inlaid linoleum by compression between calender-rolls without substantial elongation or distortion of the pattern. This result I accomplish by the use of molds having a distorted shape with reference to the final pattern to be produced, in which the tesseræ are molded in the first instance of such distorted shape and thickness that when assembled and rolled out by the calender-rolls to the final thickness the distortion will be removed and the tesseræ will assume the exact shape required by the pattern. For producing a pattern made up of a series of tesseræ I prefer to arrange the series of molds in the form of a grid, and as the amount of horizontal displacement of the granular material during the rolling out operation will vary according to the position of each tessera in the pattern each mold in the grid will be formed with the proper distortion in size and thickness to suit the position its tessera occupies in the completed pattern. For forming designs of more than one color suitable templets may be used in combination with the grids to close a portion of the molds, leaving the others open to receive composition of one color. After one set of molds has been filled another templet is applied, closing the filled molds and leaving another set open to receive composition of another color, and so on, according to the number of colors used in the pattern, until all the molds are properly filled. The distorted tesseræ thus formed and properly assembled in the grid are deposited on the backing material and rolled out into compressed form, preferably between calender-rolls, when each tessera is reduced to the exact form required by the pattern.

In the drawings I have shown two forms of grids and templets embodying my invention.

Figure 1 is a side elevation of a molding-table with the calender-rolls. Fig. 2 is a plan view of the table. Fig. 3 is a plan view of a grid for molding the tesseræ. Figs. 4 and 5 are respectively longitudinal and transverse sections on the line A A and B B. Fig. 6 is a plan view of a templet adapted for use in connection with the grid shown in Fig. 3. Fig. 7 is a linoleum pattern produced by the use of the grid and templet shown in Figs. 3 and 6 after compression. Fig. 8 is a side elevation of a molding-table and compression-rolls, illustrating the molding of the tesseræ in a cylindrical grid. Fig. 9 is an elevation of the cylindrical grid. Figs. 10 and 11 are respectively longitudinal and transverse sections on the lines C C of Fig. 11 and D D of Fig. 10, respectively. Fig. 12 is a longitudinal section of a form of templet adapted for use with the grid shown in Figs. 9, 10, and 11. Figs. 13 and 14 are plan views of other forms of molding-grids adapted for carrying out my invention; and Figs. 15, 16, 17, and 18 are detail views illustrating different forms of the devices for registering the molding-grids in proper position on the molding-table.

The tesseræ are molded in the first instance of a form distorted in length, width, and thickness to an extent proportional to the amount of horizontal displacement of material due to the rolling-out action of the calender-rolls and with the upper surface inclined or pitched to the upper corners, so that the calender-rolls will act to roll out the material by a continuous rolling action to the required thickness and in so doing will spread out the material to the proper length and width to form the exact shape desired.

In the apparatus illustrated in Sheet 1, $a$ is a suitable table over which is stretched a strip of burlap or jute backing $b$ from a roll $c$. $d$ is the molding-grid, having a series of apertures or open molds $e'$ $e^2$ $e^3$ $e^4$, formed by longitudinal and transverse partitions $f$ $g$. The upper surface of the grid in which the molds are located is inclined from the two side edges toward the center line and from the lower edge toward the top, thus presenting two inclined faces, one on each side of the transverse center line, each inclining from one lower corner to the center line at the top. The lower edges of the partitions $f$ and $g$ are in a horizontal plane. The transverse partitions $g$ on each side of the center partition are slightly inclined toward the center, and the longitudinal partitions $f$ on each side are also slightly inclined, so as to meet at an angle in the central partition $g$, forming a pentagonal outline. With this construction each mold $e'$ $e^2$ $e^3$ $e^4$ is of the form of a distorted cube with a horizontal base-plane and an inclined top plane having its apex at the upper inner corner. To produce the required distortion in the tesseræ in the first instance it is not necessary to use a grid having a distorted outline, as shown in Fig. 3, as the same result may be accomplished, e. g., with a grid of the character shown in Fig. 13, in which the molds are all arranged in regular lines with reference to one another and to the pattern to be produced, and the distortion in the mold is produced by unequal thicknesses in the partition-walls, as shown at $n'$, or with a grid of the character shown in Fig. 14, in which the molds are all of equal size and undistorted shape, and the distortion in the molded tesseræ is produced by the introduction of filling-pieces, such as $o$ $p$ $q$ $r$. The edges $h$ of the grid-frame are extended laterally and may be provided with holes $h'$, adapted to receive registering-pins $h^2$ on the table. $i$ is a templet, having its under surface complementary to the upper surface of the grid and provided with a series of apertures $j$ corresponding in size and shape to certain molds in the grids, according to the character of the pattern which is to be produced. In the drawings I have shown one of the templets adapted for use with the grid of Fig. 3 for the production of the two-colored checkered pattern shown in Fig. 7. In this case the templet is formed with apertures $j$ corresponding with alternate molds in the grid. The grid and templets are used in the following manner in forming and assembling the tesseræ: The grid is first placed upon the table on the centering-pins and over the backing-strip $b$. One templet $i$ is placed upon the face of the grid, thus leaving alternate molds open, with the others closed. The granular material of one color—say black—is then filled into the open molds. When these are filled the first templet is removed and a second one is applied identical with the first, except that its openings $j$ register with the other set of molds, the first set of filled molds now being closed by the templets. The granular material of the other color—say white—is then filled into the open molds, and the grid and templet are removed and may again be applied in the next adjacent position on the table to assemble a second series of tesseræ. The grids are arranged transversely on the table with the lower straight edges formed by the molding-pockets $e^4$ in front. As the burlap or jute backing is moved forward it carries the assembled tesseræ between a pair of calender-rolls $k$ $k$, arranged at one end of the table to compress the granular material to the required uniform thickness. Each body of granular material composed of a set of assembled tesseræ by the use of the grid shown in Figs. 3, 4, and 5 to form the pattern shown in Fig. 7 is of pentagonal outline corresponding with the bounding-lines of the outer grid-pockets and has two oppositely-inclined upper faces inclining from the outer lower corners to the apex at the top of the center line. As the material passes to the rolls $k$ $k$ the lower portion first meets them, and as the material is compressed each tessera is reduced to the proper thickness and shape to produce the desired pattern. This result is due to the fact that each tessera is distorted in length, width, and thickness to an extent proportional to the current of horizontal displacement of material due to the rolling-out action of the calender-rolls and also has a pitch to the corners, so that the calender-rolls will act to roll out the material by a continuous rolling action to the required thickness and in so doing will spread out the material to the proper length and width.

In making a continuous linoleum strip with a repeated pattern the tesseræ are assembled in the manner described at successive registered points along the backing-strip and are then carried by the strip between the calender-rolls and compressed successively into adhesion with the foundation-strip to form an unbroken compressed surface of granular material.

It is desirable that the means for registering the position of the grids with reference to the table should be capable of adjustment to suit variations in the pattern or in the size of the grids. For this purpose the pins $h^2$ may be provided with adjustable shanks movable in slots $x$ in the table or grid supports, as shown in Figs. 15 and 16, or the grids may be provided with pins or projections $t$ or $v$, adapted to adjustable sockets $u$ or $w$.

The invention is not limited to the production of any particular design to any number of colors. For example, with the grid shown in Fig. 3 a design of three or more different colors might be obtained by the use of proper templets and properly-colored granular material and the colored squares might be arranged in any relation to produce any desired design; nor is the invention limited to the production of a design made up of component elements of any particular shape, such as the square shown in Fig. 7. Any forms may be produced by shaping the molding-pockets in the grid to produce distorted tesseræ of proper form to obtain the required shape in the design when the tesseræ are compressed by the calender-rolls. Whatever the shape of final pattern may be, it may be obtained in any case by the use of the distorted molds to form the body of granular material in the first instance into a distorted shape and thickness with reference to the final shape to be produced (the distortion being proportional to the amount of horizontal displacement during compression) and then rolling out the granular material upon a suitable backing to a uniform thickness sufficient to remove the distortion.

On Sheet 2 I have shown a cylindrical grid for molding and assembling the tesseræ on the burlap in which the general form of the molds is the same as that shown in Fig. 3, except that they are formed in the walls of a cylinder $m$, which may be rolled or rotated over the surface of the burlap. The granular material is forced into the molds from the inside of the cylinder, and suitable conical templets $n$ may be used to close part of the molds to assemble tesseræ of different colors in the manner described. In Fig. 12 the conical templet $n$ is shown formed in two pieces adapted to be united in the grid $m$ from opposite ends. The cylindrical grid may be driven at a different speed from the calender-rolls.

To reduce the amount of elongation of the tesseræ when compressed as much as possible, and consequently to diminish the amount of distortion required, I prefer to use calender-rolls of different diameters, the diameter of the back roll being equal to the diameter of the face roll plus the thickness of the material.

What I claim as new, and desire to secure by Letters Patent, is as follows:

1. A mold for shaping linoleum tessera having its upper face of a geometrically-distorted shape with reference to the tessera produced from the molded composition when compresed to its final thickness.

2. A mold for shaping linoleum tesseræ having its faces of a shortened length with reference to the tessera to be produced from the molded composition when rolled out to the final thickness.

3. A mold for shaping linoleum tesseræ having its faces of a distorted width with reference to the tessera produced from the molded composition when compressed to its final thickness.

4. A mold for shaping linoleum tesseræ having an upper pitched surface.

5. A mold for shaping linoleum tesseræ having a distorted width and an upper pitched surface.

6. A mold for shaping linoleum tesseræ having a distorted width, shortened length and an upper pitched surface.

7. A mold for shaping linoleum tesseræ having its faces of a shortened length and distorted width with reference to the tessera produced from the molded composition when compressed to its final thickness.

8. A mold for shaping linoleum tesseræ having an upper pitched surface and a shortened length with reference to the tessera produced from the molded composition when compressed to its final thickness.

9. A mold for shaping linoleum tesseræ consisting of a frame having a series of molding-openings of distorted shape with reference to one another and to the tesseræ produced from the molded material when compressed to its final thickness.

10. A mold for shaping linoleum tesseræ consisting of a frame having a series of molding-openings having pitched surfaces on one side and of distorted shape with reference to the tesseræ produced from the molded material when compressed to its final thickness.

11. A mold for shaping linoleum tesseræ consisting of a frame having a series of molding-openings of distorted shape with reference to the tesseræ produced from the molded material when compressed to its final thickness, in combination with a templet adapted to fit over the surface of said mold and provided with distorted openings registering with part of the molding-openings only.

12. A mold for shaping linoleum tesseræ consisting of a frame having a series of molding-openings having pitched surfaces on one face and of distorted shape with reference to the tesseræ produced from the molded material when compressed to its final thickness, in combination with a templet having pitched surfaces complementary to the pitched surfaces of the frame and provided with distorted openings registering with part of the molding-openings only.

13. The molding-grid $d$ having a series of distorted molding-openings $e'$, $e^2$, &c., formed by the partition-walls $f$ $g$ and having its upper surfaces pitched from the outer corners toward the center line.

14. The molding-grid $d$ having a series of distorted molding-openings $e'$, $e^2$, &c., formed by the partition-walls $f$, $g$ and having its upper surfaces pitched from the outer corners toward the center line, in combination with the templet $i$ having its lower surface complementary to the upper pitched surface of the grid $d$ and a series of distorted apertures $j$ registering with part only of the molding-openings $e'$, $e^2$, &c.

15. In apparatus for making inlaid linoleum in lengths, the combination of a table of a length equal to the length of the strip to be produced, a movable molding-grid, adapted to be placed in different positions along the table to enable a series of successive bodies of assembled tesseræ to be deposited along said table in a state of rest, and calender-rolls operated after the series of sets of tesseræ have all been assembled to compress the tesseræ to a uniform thickness and form the complete strip of inlaid linoleum by a continuous operation.

16. In apparatus for making inlaid linoleum in length, the combination of a table of a length equal to the length of the strip to be produced, a movable molding-grid adapted to be placed in different positions along the table to enable a series of successive bodies of assembled tesseræ to be deposited along said table in a state of rest, centering devices for registering the successive positions of said grid with reference to the table, and calender-rolls operated after the series of sets of tesseræ have all been deposited to compress the tesseræ to a uniform thickness and form the complete strip of inlaid linoleum by a continuous operation.

17. In apparatus for making inlaid linoleum in length, the combination of a table of a length equal to the length of the strip to be produced, a movable molding-grid adapted to be placed in different positions along the table to enable a series of successive bodies of assembled tesseræ to be deposited along said table in a state of rest, removable templets adapted to be placed over the molding-grid to close part of the molds therein, and calender-rolls operated after the series of sets of tesseræ have all been deposited to compress the tesseræ to a uniform thickness and form the complete strip of inlaid linoleum by a continuous operation.

18. In apparatus for making inlaid linoleum in lengths, the combination of a table of a length equal to the length of the strip to be produced, a movable molding-grid adapted to be placed in different positions along the table to enable a series of successive bodies of assembled tesseræ to be deposited along said table in a state of rest, centering devices for registering the successive positions of said grid with reference to the table and having provision for adjustment to alter the registered positions, and calender-rolls operated after the series of sets of tesseræ have all been deposited to compress the tesseræ to a uniform thickness and form the complete strip of inlaid linoleum by a continuous operation.

19. In apparatus for molding inlaid linoleum, the combination of a long table of a length sufficient to receive a series of assembled molded tesseræ and their backing-strip, and calender-rolls between which said backing-strip and tesseræ are rolled out by a continuous operation to a uniform thickness the diameter of the face-roll being equal to the diameter of the back roll less the thickness of the linoleum fabric.

20. A molding-grid for shaping linoleum tesseræ having molding-openings of shortened length with reference to the tesseræ to be produced from the molded composition when rolled out to the final thickness, in combination with a removable templet adapted to fit over the surface of said grid and provided with openings registering with part of the molding-openings therein.

21. A molding-grid for shaping linoleum tesseræ having molding-openings of distorted width with reference to the tesseræ produced from the molded composition when compressed to its final thickness, in combination with a removable templet adapted to fit over the surface of said grid and provided with openings registering with part of the molding-openings therein.

In testimony of which invention I hereunto set my hand.

HUGH A. STAEDING.

Witnesses:
ERNEST HOWARD HUNTER,
R. M. KELLY.